United States Patent
Dial et al.

(10) Patent No.: US 10,221,468 B2
(45) Date of Patent: Mar. 5, 2019

(54) ARTICLE AND ADDITIVE MANUFACTURING METHOD FOR MAKING

(71) Applicant: GENERAL ELECTRIC COMPANY, Schenectady, NY (US)

(72) Inventors: Laura Cerully Dial, Clifton Park, NY (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 15/197,902

(22) Filed: Jun. 30, 2016

(65) Prior Publication Data
US 2018/0002785 A1 Jan. 4, 2018

(51) Int. Cl.
| | |
|---|---|
| *B23K 26/342* | (2014.01) |
| *B33Y 10/00* | (2015.01) |
| *C22C 19/05* | (2006.01) |
| *C22C 32/00* | (2006.01) |
| *C22C 1/04* | (2006.01) |
| *B33Y 70/00* | (2015.01) |
| *B23K 26/144* | (2014.01) |
| *B23K 101/00* | (2006.01) |
| *B23K 103/18* | (2006.01) |

(52) U.S. Cl.
CPC .......... *C22C 19/057* (2013.01); *B23K 26/144* (2015.10); *B23K 26/342* (2015.10); *B33Y 10/00* (2014.12); *B33Y 70/00* (2014.12); *C22C 19/056* (2013.01); *B23K 2101/001* (2018.08); *B23K 2103/26* (2018.08)

(58) Field of Classification Search
CPC ........ B22F 3/15; B22F 3/24; B22F 2003/248; C22C 19/056; C22C 19/057; C22C 1/0433; C22C 32/0052; B23K 26/342; B23K 2201/001; B23K 2203/26; C22F 1/10; B33Y 10/00; B33Y 70/00; B33Y 50/02
USPC ................ 419/29, 14, 15, 38; 148/677, 555; 219/76.1, 121.66
See application file for complete search history.

(56) References Cited

U.S. PATENT DOCUMENTS

| | | | | |
|---|---|---|---|---|
| 3,890,816 A | * | 6/1975 | Allen ................... | C22C 32/0052 75/255 |
| 4,461,659 A | * | 7/1984 | Harris ..................... | C30B 21/02 148/404 |
| 5,156,808 A | | 10/1992 | Henry | |
| 5,413,752 A | * | 5/1995 | Kissinger .................. | B22F 3/24 148/514 |
| 8,703,045 B2 | | 4/2014 | Mitchell et al. | |
| 9,352,421 B2 | | 5/2016 | Illston | |
| 2002/0041821 A1 | * | 4/2002 | Manning ............... | C22C 19/056 420/446 |
| 2011/0076179 A1 | | 3/2011 | O'Hara et al. | |
| 2013/0071562 A1 | * | 3/2013 | Szuromi ............... | B22F 3/1055 427/237 |
| 2014/0034626 A1 | | 2/2014 | Illston | |
| 2014/0220374 A1 | * | 8/2014 | Bruck ................... | C30B 11/005 428/610 |
| 2014/0295087 A1 | | 10/2014 | Rickenbacher et al. | |
| 2014/0366996 A1 | * | 12/2014 | Goncharov ............ | B23K 1/005 148/528 |
| 2015/0125335 A1 | | 5/2015 | Bruck et al. | |
| 2015/0329941 A1 | | 11/2015 | Conduit et al. | |

FOREIGN PATENT DOCUMENTS

WO    2015096980 A1    7/2015

OTHER PUBLICATIONS

Pollock et al., "Nickel-Based Superalloys for Advanced Turbine Engine Chemistry, Microstructure, and Properties", 2006, Journal of Propulsion and Power, vol. 22, No. 2, pp. 361-374. (Year: 2006).*

* cited by examiner

*Primary Examiner* — Matthew E. Hoban
*Assistant Examiner* — Lynne Edmondson

(57) ABSTRACT

Additive manufacturing methods, and articles made using additive manufacturing methods, are described herein. One embodiment is an article that comprises a hafnium-bearing superalloy. The superalloy includes at least about 50 weight percent nickel, from about 0.015 weight percent to about 0.06 weight percent carbon, and up to about 0.8 weight percent hafnium. The article further includes a plurality of primary carbide phase particulates disposed within the superalloy; the plurality has a median size less than about 1 micrometer. A method includes melting and solidifying particulates of a metal powder feedstock to build an intermediate article comprising a series of layers of solidified material. The feedstock includes the above-described superalloy composition. The method further includes heating the intermediate article to a temperature of at least about 950 degrees Celsius to form a processed article. The processed article further includes a plurality of primary carbide phase particulates disposed within the solidified material, the plurality of particulates having a median size less than about 1 micrometer.

13 Claims, No Drawings

ARTICLE AND ADDITIVE MANUFACTURING METHOD FOR MAKING

BACKGROUND OF THE INVENTION

The invention relates generally to articles made from nickel-based superalloys, and methods for making such articles. More particularly, the invention relates to additively manufactured articles fabricated using nickel-based superalloys, and methods for making such articles.

Ni-base superalloys are very useful alloys that can exhibit substantial creep and oxidation resistances at high temperatures, often in excess of 0.7 of their absolute melting temperatures. One form of high-temperature nickel base alloy of particular interest is a cast form, designed for desired creep and environmental properties, such as for example, oxidation resistance and hot corrosion resistance. One of the nickel base superalloy compositions that is widely used, especially in gas turbine components used in hot gas path applications, is known by the trade name "Rene 108," a trademark of the General Electric Company.

Additive manufacturing is a suite of emerging technologies that fabricate three-dimensional objects directly from digital models through an additive process, typically by depositing material layer upon layer and joining successive layers in place. Unlike traditional manufacturing processes involving subtraction (e.g., cutting and shearing) and forming (e.g., stamping, bending, and molding), additive manufacturing joins materials together to build products.

Certain components, such as for example, turbine engine hot-gas-path components made from nickel-base superalloys can benefit from the design flexibility enabled by the use of additive manufacturing techniques. However, superalloys tend to include a large number of alloying elements, resulting in a somewhat complicated physical metallurgy that can be sensitive to how the material is thermally and mechanically processed; These materials often present a challenge when employed in additive manufacturing methods because the rapid heating and cooling involved in these processes often result in sub-optimal alloy microstructure and material properties Therefore, it is desirable to design a nickel-base superalloy composition that can be employed in additive manufacturing methods to fabricate items having properties that are similar to their cast counterparts.

BRIEF DESCRIPTION OF THE INVENTION

Embodiments of the present invention address these and other needs. One embodiment is an article that comprises a hafnium-bearing superalloy. The superalloy includes at least about 50 weight percent nickel, from about 0.015 weight percent to about 0.06 weight percent carbon, and up to about 0.8 weight percent hafnium. The article further includes a plurality of primary carbide phase particulates disposed within the superalloy; the plurality of particulates has a median size less than about 1 micrometer.

Another embodiment is an article, comprising: a hafnium-bearing superalloy comprising at least about 50 weight percent nickel, from about 0.015 weight percent to about 0.06 weight percent carbon, from about 0.02 weight percent about 0.2 weight percent hafnium, and a gamma prime phase that is present at a concentration of at least about 50 percent by volume of the superalloy at a temperature in a range from about 700 degrees Celsius to about 800 degrees Celsius; wherein the article further comprises a plurality of primary carbide phase particulates disposed within the alloy, the plurality of particulates having a median size less than about 300 nanometers.

Another embodiment is a method for making an article via an additive manufacturing technique. The method includes melting and solidifying particulates of a metal powder feedstock to build an intermediate article comprising a series of layers of solidified material. The metal powder feedstock includes a hafnium-bearing superalloy comprising at least about 50 weight percent nickel, from about 0.015 weight percent to about 0.06 weight percent carbon, and up to about 0.8 weight percent hafnium. The method further includes heating the intermediate article to a temperature of at least about 950 degrees Celsius to form a processed article. The processed article further includes a plurality of primary carbide phase particulates disposed within the solidified material, the plurality of particulates having a median size less than about 1 micrometer.

Another embodiment is a method for making an article via an additive manufacturing technique. The method includes applying a direct metal laser melting (DMLM) process to form an intermediate article comprising a series of layers of solidified material from a metal powder feedstock; and heating the intermediate article to form a processed article. In this embodiment, heating comprises heating the intermediate article to a temperature in the range from about 950 degrees Celsius to about 1200 degrees Celsius for a time effective to substantially reduce stress within the intermediate article, hot isostatic pressing the intermediate article at a temperature and pressure effective to substantially close porosity within the intermediate article; and performing a solution heat treatment and an aging heat treatment to form a gamma prime precipitate phase within the processed article.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As noted above, "additive manufacturing" refers to a process by which digital three dimensional (3D) design data is used to fabricate a component by progressively building up layers of material. A material may be used in a powder form for building a component in a layer-by-layer manner. Additive manufacturing techniques may be referred to in the art by one or more commonly encountered names, including, for example, three-dimensional ("3-D") printing, rapid prototyping (RP), direct digital manufacturing (DDM), layered manufacturing, and additive fabrication. Advantageously, additive manufacturing is a design-driven manufacturing process that facilitates manufacturing of structures having complex design. Further, additive manufacturing provides a high degree of design freedom, optimization and integration of functional features, and a relatively high degree of product customization.

Additive manufacturing may include certain specific processes that employ powdered metal feedstock that is selectively fused together to form successive layers of solidified material; such processes are often referred to by one or more terms, some of which are used interchangeably in the art. These terms include selective laser sintering, direct metal laser sintering, selective laser melting, direct metal laser melting, and the like. For convenience, the embodiments disclosed herein are illustratively described with reference to the direct metal laser melting (DMLM) process; other additive manufacturing techniques along with required design and process variations may be applied as well.

In certain embodiments, the DMLM process starts by applying a thin layer of a powder material to a building platform. A laser beam is used to melt or fuse the powder at one or more defined portions. In one example, the portions may be defined by computer-generated component design data, such as a computer-aided design (CAD) model. Subsequently, a second layer of powder is applied on the previous layer of the powder. Optionally, the building platform may be adjusted (for example, lowered) before applying and fusing the second layer of powder. Further, material in the second layer may be melted or fused so as to bond the material in the second layer of powder with the layer below at one or more predefined portions. Similarly, subsequent layers of fused powder may be deposited on the second layer and one or more portions of these subsequent layers may be melted and solidified to form bonds between adjacent layers. Successive layers of material are thus deposited and built upon preceding layers in accordance with the governing CAD model until the desired shape is achieved. Moreover, in some embodiments, the resulting components may be subjected to further heat-treatment to impart desirable properties to the component, such as for example, required microstructure and high temperature stability.

A DMLM process or similar additive manufacturing process is characterized by high heat fluxes into and out of the feedstock material, resulting in rapid melting and solidification of the metal. Where the feedstock includes a complex alloy composition, such as a superalloy, the rapid solidification can result in formation of undesirable phases and/or phase morphologies, high levels of chemical segregation, and high levels of residual stress. For example, nickel-based superalloys are used in applications where high strength and temperature capability is required; such applications often require a superalloy composition in which the volume fraction of the primary strengthening phase, an intermetallic precipitate of nominal composition $Ni_3(Al,Ti)$ (known in the art as "gamma prime"), is greater than about 50 percent. When conventional alloys meeting these requirements are processed via DMLM, they are plagued by microcracking that renders them unusable.

US Pat. Number 9,352,421 discloses that in certain alloy systems such as the nickel-based superalloy MAR M 247, cracking can be addressed by, among other things, selecting a low-carbon variant of the alloy (or by maintaining carbon at the lower end of its specified range for the given alloy composition) to reduce the propensity of the alloy to form chains of carbide phases along grain boundaries in the solidified material. However, the present inventors have discovered that, for at least some superalloy compositions, control of carbon content is not a sufficient alloy chemistry condition to avoid the microcracking problem. For example, extensive microcracking was observed in additive manufacturing trials using a variant of superalloy RENE 108 (trademark of General Electric Company) feedstock, where the alloy chemistry was modified to reduce carbide formation.

The present inventors found that the source of the problem in the alloy systems under study was in the high levels of segregation of certain elements, particularly hafnium (Hf). When the hafnium content was reduced, alloy composition variants were identified that retained desirably high levels of gamma prime phase while dramatically reducing the formation of microcracks during DMLM processing. Embodiments of the invention described herein, including, without limitation, alloy compositions and their use in additive manufacturing methods, along with articles fabricated using these alloy compositions, were thus derived from these remarkable observations.

One embodiment of the present invention is an article. The article, in some embodiments, is a component for a gas turbine assembly, such as a shroud, blade, a vane, a combustor component, seals, or other component used in gas turbine assemblies. The article includes a hafnium-bearing superalloy, meaning a nickel-based alloy that includes a concentration of hafnium that is above what is commonly accepted in the art as an incidental impurity, for instance about 0.02 weight percent. The superalloy further includes carbon, in an amount from about 0.015 weight percent to about 0.06 weight percent. Maintaining the carbon in this range helps to limit the formation of continuous strings of carbides that can serve as failure pathways in the fabricated part. The hafnium content of the superalloy is maintained below about 0.8 weight percent, and in some embodiments, below about 0.2 weight percent. Maintaining hafnium within this range addresses the segregation issue noted previously while still allowing some hafnium to be present for its beneficial effects. For example, hafnium is often included in superalloy compositions to confer improved oxidation resistance, carbide formation and/or gamma prime strengthening.

The article further includes a plurality of primary carbide phase particulates. Here the term "primary" is used in its common metallurgical sense: a "primary" phase is formed during solidification, in contrast to secondary phases, which form during subsequent processing steps such as heat treatment. These primary carbide phase particulates are useful strengthening phases when their size, morphology, and phase fraction are maintained in an appropriate range. In some embodiments, the plurality of primary carbide phase particulates has a median size less than about 1 micrometer, and in particular embodiments, this median size is less than about 300 nanometers. The rapid solidification and cooling rates that are characteristic of DMLM and other additive manufacturing methods help to maintain fine carbide particulate size.

The composition of the superalloy further includes other elements to provide for the formation of a desired microstructure, in particular the formation of an adequate amount of gamma prime to provide requisite strength at elevated temperatures. For instance, in some embodiments, the superalloy further comprises gamma prime phase that, at a temperature in a range from about 700 degrees Celsius to about 800 degrees Celsius, is present at a concentration of at least about 50 percent by volume of the superalloy. In some embodiments, this concentration is at least about 60 percent by volume. It will be appreciated that the 700 degrees Celsius to 800 degrees Celsius temperature range is given merely as a reference to allow consistent and meaningful comparisons, as the gamma prime phase fraction in a given alloy does vary somewhat as a function of temperature. Higher gamma prime volume fractions typically result in higher strength, though often with a reduction in ductility.

In some embodiments, the superalloy further comprises cobalt, chromium, molybdenum, zirconium, tungsten, aluminum, titanium, boron, tantalum, or a combination of two or more of these. Some or all of these elements are typically present in various amounts in conventional superalloys, and generally the elements perform similar functions in the alloys disclosed herein to those they perform in conventional alloys. For example, the titanium and aluminum strongly participate in the formation of gamma prime phase. In a particular example, the superalloy of the article disclosed herein includes the following: from about 5 percent to about 15 percent by weight cobalt, from about 5 percent to about 15 percent by weight chromium, up to about 3 percent by weight molybdenum, from about 8 percent to about 12 percent by weight tungsten, from about 3 percent to about 7 percent by weight aluminum, from about 0.3 percent to about 2 percent titanium, up to about 0.03 percent by weight zirconium, from about 0.015 weight percent to about 0.06 weight percent carbon, up to about 0.03 weight percent boron, from about 1 percent to about 4 percent tantalum, up to about 0.8 percent by weight hafnium, and at least about 50 percent by weight nickel. Experiments and thermodynamic calculations indicate that alloys having composition in this range may have the requisite balance of properties to allow fabrication of articles of desirable strength levels by additive manufacturing methods without undue levels of microcracking observed for conventional alloys processed in this way.

The grain size of the superalloy in the article may affect certain properties of the material, such as its creep strength, and thus various processing steps, such as temperature and length of heat treatments, are generally controlled to provide a grain size in a desired size range. In some embodiments, the superalloy is polycrystalline and has a nominal grain size of greater than 60 micrometers.

To further illustrate aspects of the above description, a particular embodiment that includes several of the foregoing advantages is an article that includes a hafnium-bearing superalloy. The superalloy includes at least about 50 weight percent nickel. The carbon level of the superalloy is in a range from about 0.015 weight percent to about 0.06 weight percent to control carbide formation as noted previously. To deal with the segregation issue noted above, the hafnium level of the alloy is in a range from about 0.02 weight percent about 0.2 weight percent. The overall alloy chemistry, and the processing used to form the article, is such that gamma prime phase is present at a concentration of at least about 50 percent by volume of the superalloy at a temperature in a range from about 700 degrees Celsius to about 800 degrees Celsius. The article further includes a plurality of primary carbide phase particulates disposed within the alloy; due to the rapid solidification and cooling rate characteristic of the additive manufacturing process typically used to form the article, these particulates have a median size less than about 300 nanometers.

Other embodiments of the present invention include a method for making the article described above. Typically the superalloy described above is employed as a powder feedstock in an additive manufacturing process, which of course involves melting and solidifying the superalloy powder feedstock to build an intermediate article in a layer-by-layer fashion so that the intermediate article comprises a series of layers of solidified material. Typically, the melting and solidifying steps are performed selectively, that is, in particular predetermined regions, in accordance with a computer-coded model (such as a CAD model) of the intermediate article. For example, a CAD model of an intermediate article may be applied to an additive manufacturing system to direct a focused heat source to specific regions of a bed containing the superalloy powder, melting and solidifying powder to form a series of layers of solidified material that correspond to the CAD model. In some embodiments, the melting of the powder is performed by irradiating the powder with a laser. In particular embodiments, the melting and solidifying is performed by a direct metal laser melting (DMLM) process. The DMLM process, and systems that utilize this process to build items, are well known in the art and will not be described in detail here.

As noted above, the superalloy described herein, with its controlled concentrations of hafnium and carbon, is used in powder form as a feedstock in an additive manufacturing process. Any embodiment of the superalloy may be used in the feedstock. As noted previously, the level of hafnium is controlled to reduce harmful segregation during solidification of the melted powder, and the carbon level is controlled to reduce formation of undesirable carbide phase "chains." These attributes may significantly reduce cracking in parts formed by DMLM or other additive manufacturing processes.

After the intermediate article is built, further processing steps are typically employed to further enhance its properties. Typically the intermediate article is heated to effect some change to the microstructure and/or macrostructure of the intermediate article to form a processed article. The processed article may have any of the attributes described previously for embodiments directed at an article. The heating step may include one or more treatments for various functions. In one embodiment, heating includes an annealing step—that is, a heat treatment designed to reduce stresses in the intermediate article. In certain embodiments this includes heating the intermediate article to a temperature in the range from about 950 degrees Celsius to about 1200 degrees Celsius for a time effective to substantially reduce stress within the intermediate article. In some embodiments, heating includes applying heat and pressure to reduce porosity within the intermediate article. For example, the intermediate article may be subjected to hot isostatic pressing (HIP) at a temperature and pressure effective to substantially close porosity within the intermediate article. In some embodiments, the HIP may be done at a temperature in the range from about 950 degrees Celsius to about 1250 degrees Celsius, with pressure up to about 30 ksi (about 210 MPa). One illustrative example includes a HIP step performed at a temperature of 1200 degrees Celsius and a pressure of 15 ksi (about 105 MPa). Finally, in some embodiments heating includes a solution-and-age heat treatment typical of superalloys and other precipitation-hardened alloys. This involves heating the article to a temperature below an incipient melting temperature for the particular alloy but above the solvus temperature of the precipitate, here gamma prime, to dissolve some or all of the precipitate, followed by a second heat treatment at a lower temperature where the gamma prime is allowed to precipitate ("age") at the desired size and morphology. Specific suitable heat treatment temperatures can be determined by experimental observation and/or by thermodynamic calculation for individual alloy compositions. In some embodiments, the solution heat treatment is done at a temperature in the range from 1050 degrees Celsius to 1250 degrees Celsius. In some embodiments, the aging heat treatment is done at a temperature in the range from 800 degrees Celsius to 900 degrees Celsius.

To further illustrate the above description, one embodiment is a method for making an article via an additive manufacturing technique. The method comprises applying a direct metal laser melting (DMLM) process to form an intermediate article comprising a series of layers of solidified material from a metal powder feedstock; and heating the intermediate article to form a processed article. In this illustrative embodiment, the heating step all three of the various aspects described above for heating: (a) heating the intermediate article to a temperature in the range from about 950 degrees Celsius to about 1200 degrees Celsius for a time effective to substantially reduce stress within the intermediate article; (b) hot isostatic pressing the intermediate article at a temperature and pressure effective to substantially close porosity within the intermediate article; and (c) performing a solution heat treatment and an aging heat treatment to form a gamma prime precipitate phase within the processed article.

EXAMPLES

To further illustrate, but not limit, embodiments of the present invention, the following example is provided.

A series of powder compositions based on RENE 108 alloy were produced and used as experimental feedstock in DMLM process trials. The build parameters were the same for the various materials. All of the powders were gamma-prime-strengthened compositions with gamma prime volume fractions of 50 volume percent or higher. Six different compositions were tested. Three of the compositions had hafnium content of 0.8 weight percent or higher. Remarkably, each of these compositions failed, yielding articles that were severely cracked, even a composition designed with low carbon to strictly limit carbide formation. The other three compositions, with hafnium compositions below 0.8 weight percent, showed much better performance.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A method for making an article via an additive manufacturing technique, the method comprising:
   melting and solidifying particulates of a metal powder feedstock to build an intermediate article comprising a series of layers of solidified material, wherein the metal powder feedstock comprises a hafnium-bearing superalloy comprising at least about 50 weight percent nickel, from about 0.015 weight percent to about 0.06 weight percent carbon, from about 0.02 weight percent to about 0.2 weight percent hafnium; and
   heating the intermediate article to a temperature of at least about 950 degrees Celsius to form a processed article; wherein the processed article further comprises a plurality of primary carbide phase particulates disposed within the solidified material, the plurality of particulates having a median size less than about 300 nanometers and a gamma prime phase that is present at a concentration of at least about 50 percent by volume of the superalloy at a temperature in a range from about 700 degrees Celsius to about 800 degrees Celsius.

2. The method of claim 1, wherein the melting and solidifying is performed selectively in accordance with a computer-coded model of the intermediate article.

3. The method of claim 2, wherein the melting is performed by irradiating the feedstock with a laser.

4. The method of claim 1, wherein the melting and solidifying is performed by a direct metal laser melting (DMLM) process.

5. The method of claim 1, wherein the superalloy comprises
   a. from about 5 percent to about 15 percent by weight cobalt,
   b. from about 5 percent to about 15 percent by weight chromium,
   c. up to about 3 percent by weight molybdenum,
   d. from about 8 percent to about 12 percent by weight tungsten,
   e. from about 3 percent to about 7 percent by weight aluminum,
   f. from about 0.3 percent to about 2 percent titanium,
   g. up to about 0.03 percent by weight zirconium,
   h. up to about 0.03 weight percent boron,
   i. from about 1 percent to about 4 percent by weight tantalum, and
   j. at least about 50 percent by weight nickel.

6. The method of claim 1, wherein heating comprises heating the intermediate article to a temperature in the range from about 950 degrees Celsius to about 1200 degrees Celsius for a time effective to substantially reduce stress within the intermediate article.

7. The method of claim 1, wherein heating comprises hot isostatic pressing the intermediate article at a temperature and pressure effective to substantially close porosity within the intermediate article.

8. The method of claim 1, wherein heating comprises a solution heat treatment and an aging heat treatment to form a gamma prime precipitate phase within the processed article.

9. A method for making an article via an additive manufacturing technique, the method comprising:
   applying a direct metal laser melting (DMLM) process to form an intermediate article comprising a series of layers of solidified material from a metal powder feedstock, wherein the metal powder feedstock comprises a hafnium-bearing superalloy comprising at least about 50 weight present nickel, from about 0.015 weight percent to about 0.06 weight percent carbon, from about 0.02 weight percent to about 0.2 weight percent hafnium; and
   heating the intermediate article to form a processed article, wherein heating comprises
      heating the intermediate article to a temperature in the range from about 950 degrees Celsius to about 1200 degrees Celsius for a time effective to substantially reduce stress within the intermediate article;

hot isostatic pressing the intermediate article at a temperature and pressure effective to substantially close porosity within the intermediate article; and performing a solution heat treatment and an aging heat treatment to form a gamma prime precipitate phase within the processed article.

10. The method of claim 1, wherein the concentration is at least about 60 percent by volume of the superalloy.

11. The method of claim 1, wherein the superalloy further comprises cobalt, chromium, molybdenum, zirconium, tungsten, aluminum, titanium, boron, tantalum, or a combination of two or more of these.

12. The method of claim 1, wherein the superalloy is polycrystalline and has a nominal grain size of greater than 60 micrometers.

13. The method of claim 1, wherein the plurality of primary carbide phase particulates is present in the superalloy at a concentration of less than about 0.5 volume percent of the alloy.

\* \* \* \* \*